United States Patent [19]

Post

[11] 3,741,034

[45] June 26, 1973

[54] INERTIAL ENERGY STORAGE APPARATUS

[75] Inventor: Stephen F. Post, Walnut Creek, Calif.

[73] Assignee: Darrell E. Williams and Kenneth Fowler, both of Walnut Creek, Calif. part interest to each

[22] Filed: Sept. 2, 1970

[21] Appl. No.: 68,959

[52] U.S. Cl. .................................................. 74/572
[51] Int. Cl. ........................................... F16c 15/00
[58] Field of Search .......................... 74/572, 5.34; 188/185

[56] References Cited
UNITED STATES PATENTS

| | | |
|---|---|---|
| 3,602,066 | 8/1971 | Wetherbee, Jr. .................. 74/572 |
| 3,602,067 | 8/1971 | Wetherbee, Jr. .................. 74/572 |
| 1,501,886 | 7/1924 | Abbot .......................... 74/5.34 X |
| 2,577,313 | 12/1951 | Downing ........................ 74/5.34 |
| 2,734,280 | 2/1956 | Christoph ...................... 74/5.34 X |
| 3,296,886 | 1/1967 | Reinhart, Jr. ................... 74/572 |
| 3,490,748 | 1/1970 | Hoffman ...................... 188/185 X |

FOREIGN PATENTS OR APPLICATIONS

| | | |
|---|---|---|
| 61,717 | 12/1911 | Austria ........................... 74/572 |

Primary Examiner—Charles J. Myhre
Assistant Examiner—F. D. Shoemaker
Attorney—Rankin A. Milliken

[57] ABSTRACT

Inertial energy storage apparatus having two contrarotating rotors the fellies of which include a number of thin rings of high tensile strength material, such as glasses or embedded fiber composites, arranged in concentric shells, the ratio of the Young's Modulus to the density of the material of each ring being proportional to the $n^{th}$ power of its mean radius, where n is not equal to zero, so that the radial separations between successive shells of rings produced by centrifugal force are reduced as compared with those produced when $n$ is zero (e.g., all rings of the same material). The rotors have alternator-motors in their hubs, by means of which they can be brought to speed, and by means of which the inertial energy stored in them can be extracted in the form of variable-frequency alternating output voltage. This output voltage may be converted by a solid-state cycloconverter to alternating current of selectively variable frequency by means of which to power, for instance, the three-phase, squirrel-cage wheel motors of a non-pollution-producing vehicle.

40 Claims, 3 Drawing Figures

INVENTOR
STEPHEN F. POST
BY Rankin A Milliken
ATTORNEY

INERTIAL ENERGY STORAGE APPARATUS

The present invention relates to inertial energy storage apparatus of the kind in which inertial energy is stored in a rotor and extracted therefrom by means of an electrical generator coupled thereto, and more particularly to improved rotors for use in such apparatus.

Vehicles propelled by energy derived from inertial energy storage apparatus of this general kind have hitherto been made and used. A vehicle of this type which was actually put into regular service in a major city was a bus driven by power derived from a 3,300-pound, 64-inch diameter, conventional flywheel. The range of this vehicle on a single charge of rotational energy to the flywheel was limited to somewhat over one-half mile, however, and in consequence it was necessary to provide charging facilities at each bus stop; full charging at which required about 2 minutes.

More recently, proposals have been made for the utilization of diametrically-directed straight strands of high tensile strength materials in inertial energy storage rotors, in order to increase the stored energy density, i.e., the amount of energy stored per unit volume of the energy storage apparatus.

These proposed constructions have achieved considerable increase in stored energy density as compared with the abovesaid bus propulsion system, but have not reached the stored energy density values which would appear to be required in order to make inertial energy propelled vehicles attractive as substitutes for the present, pollution-producing internal combustion engine powered vehicles in general use.

The need for the maximum possible stored energy density in inertial energy storage apparatus is most critical in passenger vehicles, such as taxis and private passenger automobiles, in which maximum range per energy charge must be achieved without unduly sacrificing available passenger and cargo volume.

It is therefore an object of the present invention to provide inertial energy storage apparatus suitable for use in vehicular applications in which the stored energy density is greater than has hitherto been achieved.

Other objects of the invention will in part be obvious and will in part appear hereinafter.

With these objects in view, the present invention comprises as a principal feature the provision of a novel rotor for use in vehicular inertial energy storage apparatus. The felly of this novel rotor is comprised of a plurality of rings of high tensile strength material, such as glasses or embedded fiber composites (e.g., carbon fiber-epoxy composites), arranged in concentric shells, the ratio of the Young's Modulus to the density of the material of each ring being proportional to the $n^{th}$ power of its mean radius, when $n$ is not equal to zero, so that the radial separations between successive shells of rings produced by centrifugal force are reduced as compared with those produced when $n$ is zero, thus permitting the optimal utilization of high tensile strength materials, and at the same time considerably increasing the stored energy density within a given rotor volume (e.g., by 80 percent).

The invention, accordingly, comprises the feature of construction, combinations of elements, and arrangements of parts which will be exemplified in the construction hereinafter set forth, and the scope of the invention will be indicated in the appended claims.

For a fuller understanding of the nature and objects of the invention, reference should be had to the following detailed description, taken in connection with the accompanying drawings, in which.

Figure 1:
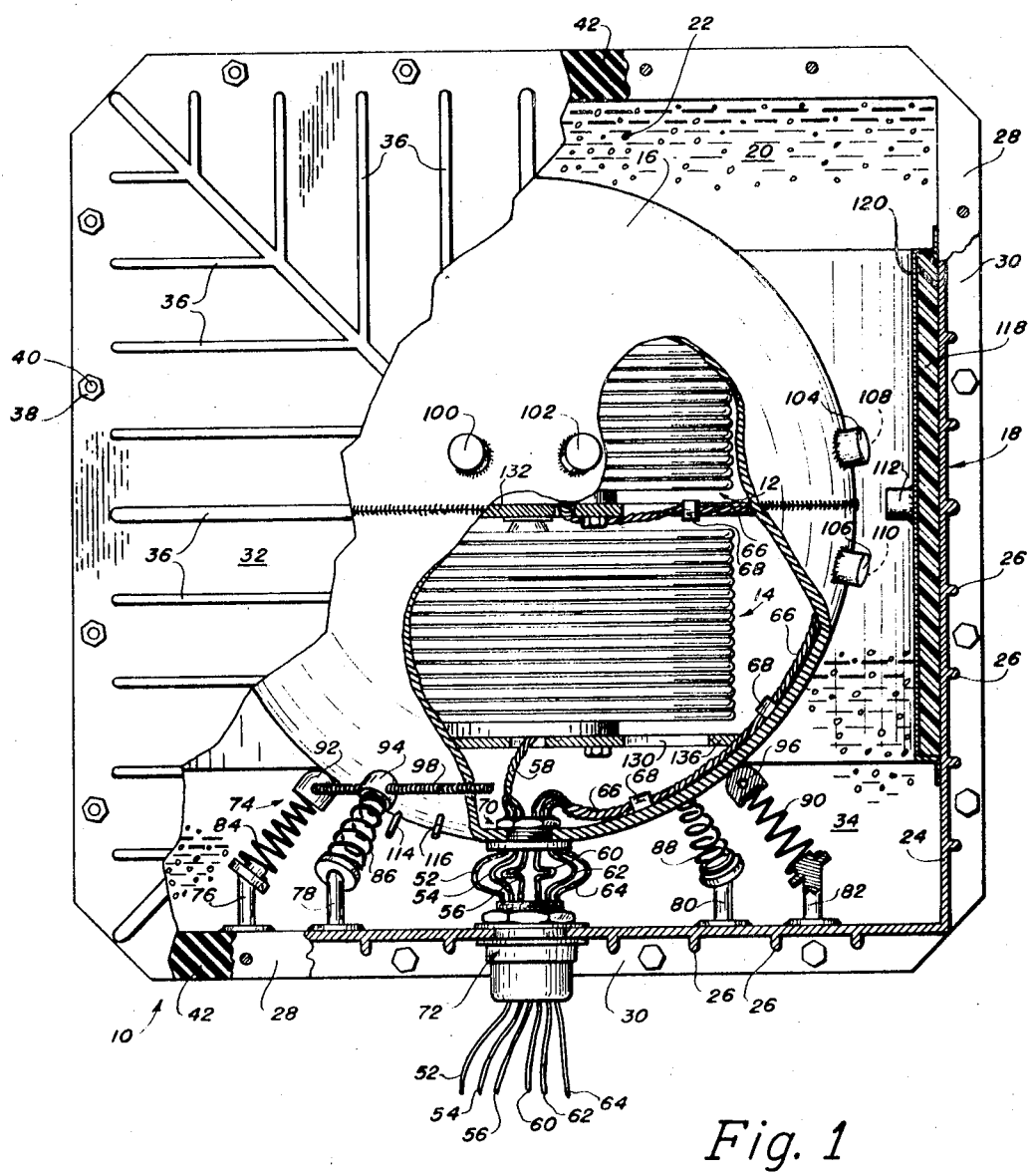
FIG. 1 is a detailed side view in section of an inertial energy storage module of the kind in which the rotors of the present invention may be employed.
Figure 2:
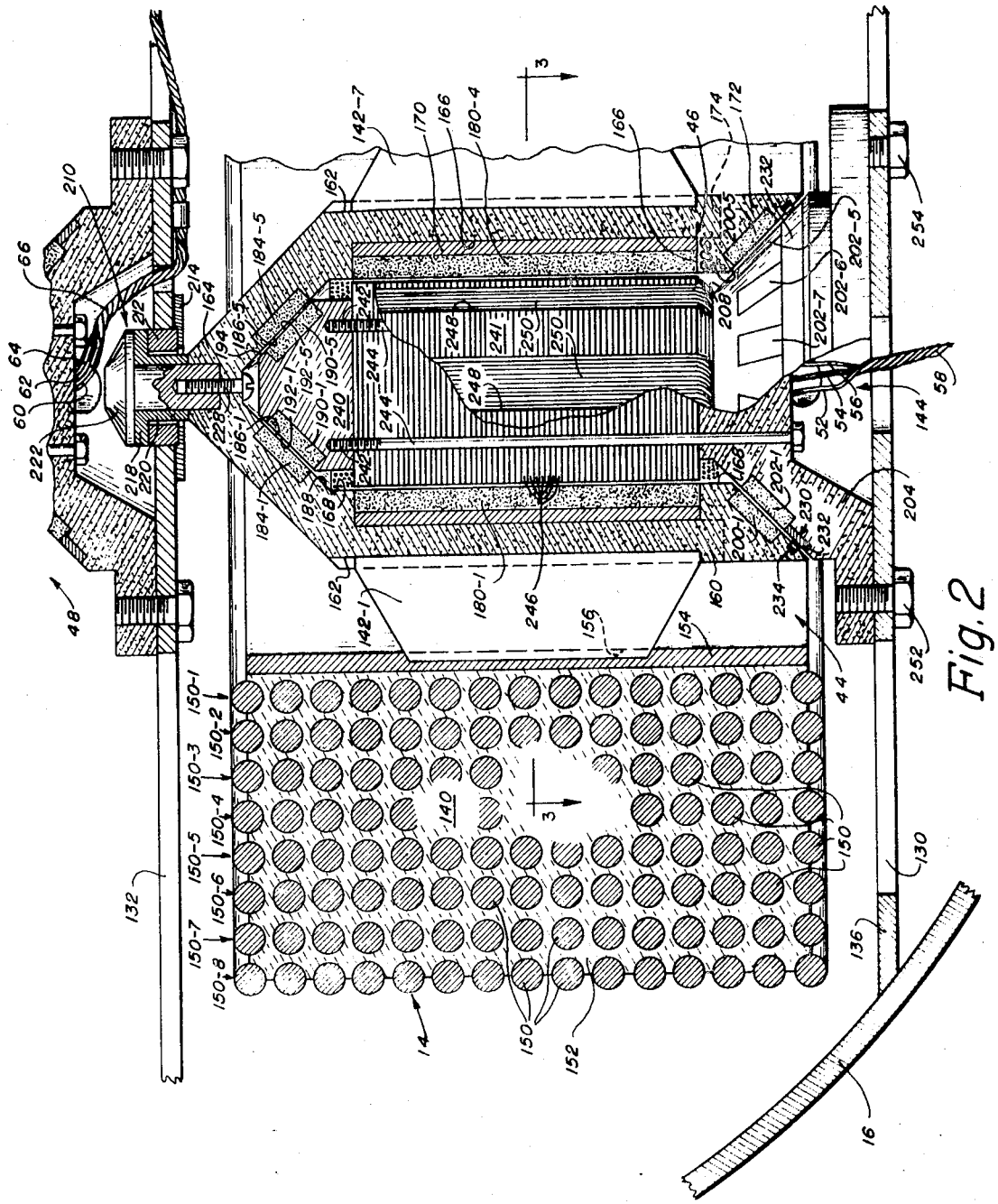
FIG. 2 is a sectional view in elevation of an inertial energy storage rotor of the kind in which the present invention may be employed.
Figure 3:
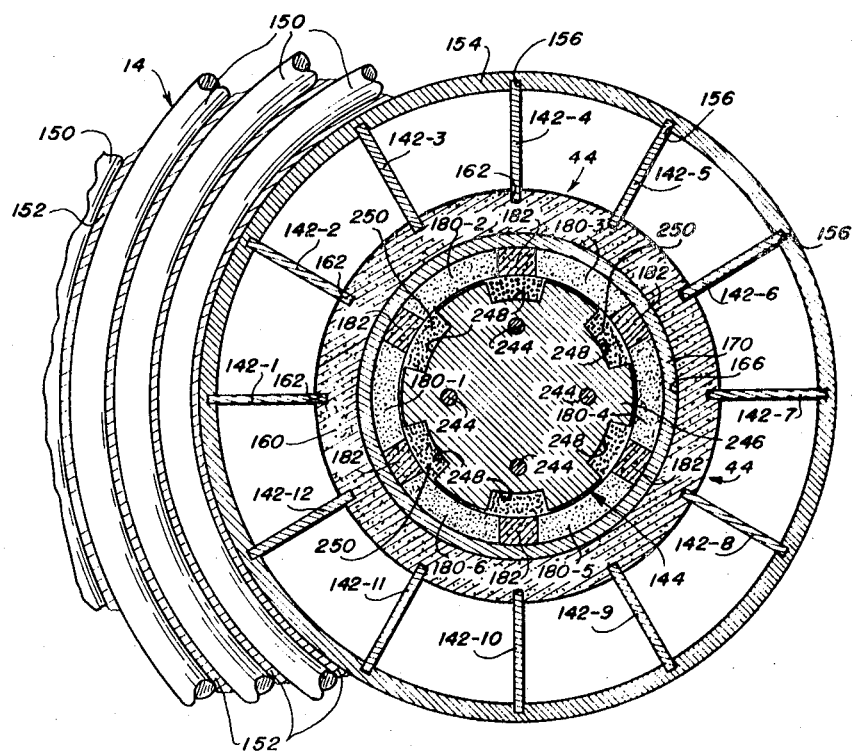
FIG. 3 is a sectional view of the structure shown in FIG. 2, taken along line 3—3.

Referring now to the drawings, there is shown in FIGS. 1, 2, and 3, taken together, an inertial energy storage unit or module of the kind in which the present invention may be utilized.

The particular inertial energy storage module 10 which is shown in FIGS. 1, 2, and 3 comprises two inertial storage rotors 12,14 mounted in an evacuated shell 16. As shown in FIG. 1, evacuated shell 16 is disposed in a liquid-filled tank 18. It is to be understood, however, that the use of a single rotor of the type claimed in the appended claims falls within the scope of the invention.

In order to minimize windage losses, reduce ring deterioration due to chemical attack, and facilitate energy absorption in the event of rotor failure, spherical shell 16 may be evacuated to about $10^{-3}$ to $10^{-5}$ Torr.

In order to provide protection in the event that the rotors 12, 14 are inadvertently operated at rotary speeds greater than their maximum design speed, and one or both of them rupture, tank 18 is filled with a viscous, high-density liquid 20, such as ethylene glycol. A suitable expansion chamber, of the type used, e.g., in liquid-filled marine compasses, may be provided in a wall of tank 18 to compensate for the thermal expansion of liquid 20.

As an additional safety feature, liquid 20 may be filled, to the extent that it becomes a slurry, with small particles 22 of porous, highly crushable material, whereby the energy of the centrifugally-propelled particles of a ruptured rotor may be absorbed.

A suitable material from which crushable particles 22 may be fabricated is that material known as polyurethane foam, which may be provided with a suitable protective coating.

Other safety features incorporated in the particular inertial energy storage module of FIGS. 1, 2, and 3 will be described hereinafter.

Due to the high energy storage density achieved in inertial energy storage rotors embodying the present invention, practically useful quantities of energy can be stored in inertial energy storage rotors which are sufficiently small to permit their being encased in protective means capable of absorbing the total dissipated centrifugal energy of a ruptured rotor, or rotors, while yet the over-all dimensions of the protective means are sufficiently small so that the inertial energy storage module comprising the rotor, or rotors, or several such inertial energy storage modules, can be employed to power, say, a small automobile, without unduly limiting the available passenger or cargo volume thereof.

Tank 18 may, for instance, comprise a single casting or weldment 24 consisting of four walls which extend perpendicular to the plane of FIG. 1 and are joined along their edges which extend perpendicular to the plane of FIG. 1. The walls of casting or weldment 24 may be provided with stiffening ribs 26. Further, casting or weldment 24 is provided at its opposite, open ends with suitable flanges 28, 30 by means of which cover plates 32, 34 may be liquid-tightly affixed to casting or weldment 24. The end plates 32, 34 may be provided with stiffening ribs 36. The cover plates 32, 34 may suitably be affixed to the flanges 28, 30 of casting or weldment 24 by nuts 38 and studs 40, in which event it will be desirable to provide suitable gaskets 42.

As seen in FIGS. 2 and 3, the hub 44 of rotor 14 incorporates a six-pole alternator-motor. This alternator-motor is generally designated by the reference numeral 46. The assembly which includes rotor 12 is substantially identical to the assembly which includes rotor 14. The hub 48 of rotor 12 incorporates a six-pole alternator-motor 50 (not shown) which is substantially identical to alternator-motor 46 in the hub 44 of rotor 14. The electrical power generated by alternator-motor 46 is produced on three leads 52, 54, 56 which, when suitably cabled, are collectively designated by the reference numeral 58. The electrical power generated by alternator-motor 50 is produced on three leads 60, 62, 64 which, when suitably cabled, are collectively designated by the reference numeral 66. Cable 66 is affixed to the support means which support the adjacent ends of the hubs 44, 48, and to the wall of shell 16, by means of suitable clips 68. Leads 52, 54, 56, 60, 62, and 64 pass through the wall of shell 16 via vacuum-tight hermetic sealing means 70. Leads 52, 54, 56, 60, 62, 64 pass through the wall of tank 18 via liquid-tight sealing means 72. As shown in FIG. 1, free bights or hairpin-loops of leads 52, 54, 56, 60, 62, and 64 are provided between sealing means 70 and sealing means 72. These free portions of leads 52, 54, 56, 60, 62, and 64 are provided in order to accommodate motion of shell 16 with respect to tank 18, as will now be explained.

Shell 16 and its contents are so designed and the density of liquid 20 is so chosen that shell 16, along with its contents, is dampingly constrained thereby, shell 16 and its contents having a slightly negative buoyancy factor with respect to liquid 20. That is to say, liquid 20 is so chosen that in vehicular applications of the inertial energy storage module shell 16 and its contents follow accelerations of tank 18 in a damped manner, while, at the same time, shell 16 would lightly rest on the bottom of tank 18 but for the resilient support offered by support cradle 74, which will now be described.

Cradle 74 comprises a plurality of pedestals, only some of which, 76, 78, 80, 82, are shown in the drawings (FIG. 1). These pedestals are affixed to the bottom of tank 18 in a circular array. One of the conically wound coil springs 84, 86, 88, 90, etc., is affixed to the upper end of each pedestal 76, 78, 80, 82, etc. A head, 92, 94, 96, etc., is affixed to the upper end of each of said springs 82, 84, 86, 88, 90, etc. The upper end of each head 92, 94, 96, etc., is provided with a smooth, rounded surface which is adapted to contact and support shell 16 without damaging it. A single, elongated coil spring 98 passes through suitable bores in all of said heads 92, 94, 96, etc., and resiliently maintains them against outward, spreading movement in response to the small downward force exerted by shell 16 and its contents. Spring 98 is of sufficient length, and its end are so joined, that its normally exhibits a circular configuration, and thus does not contact the wall of shell 16. Shell 16, then, normally rests in cradle 74, upon heads 92, 94, 96, etc., and its movement in response to accelerations of tank 18 (in vehicular applications of the inertial energy storage module) is damped by liquid 20.

Shell 16 is further resiliently maintained in its position within tank 18 by means of four sets of five permanent magnets, 100, 102, 104, 106, 108, 110, 112, etc. A single permanent magnet is affixed to the interior of each vertical wall of tank 18. Four permanent magnets, affixed to the outside of shell 16, cooperate with each one of the permanent magnets which is affixed to a wall of tank 18. Thus, as shown in FIG. 1, the four permanent magnets 104, 106, 108, 110 (108 and 110 being concealed behind 104 and 106, respectively in FIG. 1) together cooperate with permanent magnet 112, which is affixed to the right-hand, vertical wall of tank 18, as shown in FIG. 1. The outer ends of all of the permanent magnets 100, 102, 104, 106, 108, 110, 112, etc., i.e., the ends remote from the ends of these magnets which are affixed to a wall of tank 18, or to shell 16, are of the same magnetic polarity. For example, the outer ends of all of the permanent magnets 100, 102, 104, 106, 108, 110, 112, etc., may be South poles. Further, the magnets of each set of four affixed to the outer surface of shell 16, e.g., 104, 106, 108, 110, are normally equidistant from their associated magnet which is affixed to a wall of tank 18, e.g., magnet 112. Thus, any force tending to displace shell 16 from its normal position will be opposed by forces produced by the above-described sets of four permanent magnets, each set cooperating with its associated one permanent magnet affixed to a wall of tank 18. For example, any tendency of shell 16 to rotate about its vertical axis in a clockwise direction (looking down from the top of FIG. 1) will be opposed by repulsion forces between magnets 108 and 110 and magnet 112, as well as by similar repulsion forces produced by the magnets affixed to the three other vertical walls of tank 18 and two each of their associated sets of four permanent magnets. The magnetic positioning arrangement just described also produces forces opposing the upward displacement of shell 16 in tank 18, and opposing the tilting of the vertical axis of shell 16 with respect to the horizontal walls of tank 18. Alternatively, each of the sets of five coacting magnets may be replaced with a coil spring extending from the tank wall to the nearest point of the shell.

A plurality of pins 114, 116, etc., are affixed to the outer surface of shell 16 in a horizontal circular array, as indicated in FIG. 1. These pins, 114, 116, etc., serve to prevent extreme angular excursions of shell 16, in vehicular applications of the inertial energy storage module, when they engage spring 98 or heads 92, 94, 96, etc.

Additional protection in the event of rupture of rotor 12 or 14 may be provided by affixing a ring-shaped band 118 of suitably selected material to the inside of tank 18, as shown in FIG. 1. Such a suitably selected material may be made, for instance, from continuous rovings of carbonized filamentary material bonded into a unitary mass with epoxy cement. When such a band 118 of carbon-epoxy material, or the like, is used, it is desirable to affix the outer positioning magnets 112, etc., to straps 120, the ends of which are affixed to the vertical walls of tank 18 immediately outside the wall area covered by band 118, as shown in FIG. 1. By this means it is possible to avoid breaks in the carbon filament rovings, while at the same time supporting band 118 is in its operative position. Provision of band 118 in ring-shaped form (i.e., of circular cross-section) permits damping liquid 20 to contact the metal walls of tank 18 over maximum area for maximum heat transfer. If band 118 were of square cross-section, and contacted the vertical walls of tank 18 throughout its outer surface, considerable heat transfer surface would thereby be lost.

Considering now the apparatus disposed within shell 16, it may be seen from FIG. 1 that the principal content of shell 16 is the two inertial energy storage rotors 12, 14.

Rotors 12,14 are supported within shell 16 by three spiders 130, 132, 134, only two of which, viz., 132 and 134 are shown in the drawings.

Spider 134 is located above rotor 12 in the upper portion of shell 16, and supports the upper end of rotor 12. Spiders 130, 132, 134 may be directly affixed to the inner surface of shell 16, as by welding, and may include an outer ring, such as indicated by the reference numeral 136 in FIGS. 1 and 2, in order to provide stress distribution. The lower ring, 136, if such rings are employed, may be provided with a suitable opening at one place on its periphery to accommodate cable 66.

Referring now to FIGS. 2 and 3, the construction of lower rotor 14 will be described in detail, it being understood that upper rotor 12 is substantially identical in construction to lower rotor 14.

Rotor 14 comprises a rim or felly 140, a plurality of spokes 142-1 through 142-12, and a hub 44. Hub 44 is journalled upon a spindle assembly, or spindle, 144 (FIG. 2).

Felly 140 is comprised of a plurality of rings 150, fabricated from high tensile strength materials, e.g., glasses, selected in accordance with the principles of the present invention, as will be more fully set forth hereinafter.

In accordance with a preferred embodiment of the present invention, rings 150 are disposed in a plurality of cylindrical shells, designated by the reference numerals 150-1 through 150-8 in FIG. 2. As may be seen in FIG. 2, each of the cylindrical shells 150-1 through 150-8 of rings 150 consists of 15 rings 150. The felly 140 of the embodiment of the present invention shown in the drawings, then, comprises 120 rings, each of which is designated by the reference numeral 150, these 120 rings 150 being disposed in a collocation consisting of eight concentric cylindrical shells 150-1 through 150-8. It is to be understood, however, that the present invention is not limited to this particular collocation of 120 rings, nor to the employment of rings arranged in concentric cylindrical shells, nor to the employment of shells having equal numbers of rings. In some embodiments the number of rings may exceed 1,000, for example. It is to be further understood that the present invention is not limited to the employment of rings taking the form known as "anchor rings", as shown in the present drawings, having circular cross-section, but also embraces constructions in which the rings are of any toroidal configuration. In some cases, for instance, each shell may be a single thin ring of considerable axial extent. The term "thin ring" as used herein means any ring whose radial thickness is sufficiently small in relation to its mean radius so that the action of centrifugal force produces substantially only pure hoop stresses, all other types of stress being negligible by comparison. The term "collocation" is used herein in its broadest acceptation, to include any spatial arrangement of physical elements in which each element has a predetermined location defined with respect to the positions of the other elements. The term "contiguous" is used herein in its broadest acceptation, to include all closely adjacent rotor rings, of whatever cross-sectional configuration and collocation.

The rings 150 of felly 140 are embedded in a matrix 152 of low vapor pressure elastic material, such as silicone rubber.

The matrix 152 itself may be affixed to a cylindrical core 154, as by cementing. Core 154 may be provided with a plurality of slots 156 which are adapted to receive the outer ends of the spokes, 142-1 through 142-12.

As may be seen by comparison of FIGS. 2 and 3, spokes 142-1 through 142-12 may be made of sheet material, e.g., sheet aluminum, and may be of light construction.

As shown in FIG. 2, it is desirable to taper the thin, fin-like spokes 142-1 through 142-12 outwardly in order to reduce the radial stresses therein to a tolerable level. This taper may, for instance, vary inversely with the square of the radius, whereby the radial stress is substantially reduced relative to the stress which would occur at the same radius in a non-tapered spoke. In other words, spokes 142-1 through 142-12 function only to support the felly 140 in its operative position relative to hub 44 and to transmit the relatively weak torques required during power output and power input to the felly 140, and thus they may be made of very thin material, if this is found desirable in a particular design. It should be noted that only relatively weak torques are transmitted by spokes 142-1 through 142-12 because of the high speed of rotation at which the rotors of the devices of the invention are designed to operate, e.g., speeds in the range of about 500 revolutions per second to 2,500 revolutions per second.

Further detailed description of certain particular parts of the inertial energy storage module of the present drawings may be found in the copending U. S. Pat. No. 3,683,216, of Richard F. Post, issued on Aug. 8, 1972.

Hub 44 comprises a body 160 of high-strength material such as carbon fiber-epoxy composite (see, "Carbon Fiber Composites for Aerospace Structures," A. C. Ham, *Physics Bulletin*, (British), Vol. 20, p. 444, 1969; *Popular Science* magazine, February, 1969) which is of generally cylindrical configuration, and is provided on its outer surface with a plurality of slots 162, each one of said slots 162 being adapted to supportingly receive the inner end of one of the spokes 142-1 through 142-12. As seen in FIG. 2, hub body 160 is provided at its upper end with an integral, generally conical cap member 164, the function of which will be hereinafter explained in detail.

A cylindrical cavity 166 is provided in the inner face 168 of hub body 160. At the bottom of cavity 166, i.e., the part of cavity 166 most remote from the axis of hub 44, there is disposed a cylindrical magnetic shunt 170, which may be fabricated from magnetically soft iron, or may be fabricated from magnetic steel laminae in order to reduce iron losses. In order to emplace shunt 170 in cavity 166 the lower or skirt portion 172 of hub body 160 may be formed separately from the main cylindrical portion of hub body 160. When such a mode of construction is adopted, magnetic shunt 170 may be inserted into cavity 166 in a direction parallel to the axis of hub body 160, whereafter skirt member 172 may be joined to the main portion of hub body 160 along the seam indicated by the dashed lines 174 in FIG. 2. Alternatively, hub body 160, including an integral skirt 172, may be cast or molded around magnetic shunt 170. In either event, i.e., whether hub body 160 is of one-piece or two-piece construction, the part of hub body 160 extending below cavity 166, as seen in FIG. 2, will sometimes hereinafter be called the "skirt".

Also contained in cavity 166 are the permanent magnet field poles 180-1 through 180-6 of alternator-motor 46. As shown in FIG. 3, intermediate bodies 182 may be disposed between poles 180-1 through 180-6, and these intermediate bodies may be composed of the same material from which hub body 160 is formed. Poles 180-1 through 180-6 may be bolted or socketed to magnetic shunt 170, in the conventional manner, and the intermediate bodies 182 may be made integral with the main portion of hub body 160 by extending through suitable openings in the magnetic shunt 170.

As may be seen in FIG. 2, permanent magnets 184-1 and 184-5 are embedded in the inner face of the conical cap portion 164 of hub body 160. The inner faces 186-1 and 186-5 of said permanent magnets 184-1 and 184-5 are flush with the inner surface 188 of conical cap portion 164, and are contoured to match the contour of said inner surface 188. Eight additional permanent magnets 184-2 through 184-4 and 184-6 through 184-10 are also embedded in the inner surface 188 of the conical cap portion 164 of hub body 160. The permanent magnets 184-1 through 184-10 are equiangularly spaced about the axis of hub body 160, forming a circle whose plane is perpendicular to the axis of hub body 160. The inner surfaces 186-1 through 186-10 of the permanent magnets 184-1 through 184-10 are all flush with the conical inner surface 188 of the cap portion 164 of hub body 160. The permanent magnets 184-1 through 184-10 cooperate with a corresponding plurality of permanent magnets 190-1 through 190-10 (FIG. 2) to act as a very low friction periodic magnetic bearing for the purpose of rotatably supporting rotor 14 for low friction rotation about its spindle 144, the outer surfaces 192-1 through 192-10 of these permanent magnets being flush with the outer surface 194 of the generally conical upper end of spindle 144.

A second periodic magnetic bearing, employed for the same purpose as the above-described periodic magnetic bearing, is comprised of a plurality of permanent magnets 200-1 through 200-10, embedded in the skirt 172 of hub body 160, which cooperate with a corresponding plurality of permanent magnets 202-1 through 202-10 embedded in the base 204 of spindle 144. The exposed faces of the permanent magnets 200-1 through 200-10 are flush with the inner surface 206 of skirt 172, and are contoured to match the contour of the inner surface of skirt 172. Similarly, the exposed faces of the permanent magnets 202-1 through 202-10 are flush with the conical outer surface 208 of base 204, and are contoured to match the contour of the conical outer surface 208 of base 204.

Further detailed description of the class of periodic magnetic bearings which includes the above said periodic magnetic bearings will be found in the abovesaid U.S. Patent of Richard F. Post.

In addition to the abovesaid periodic magnetic bearings, by which rotor 14 is suspended during operation of the inertial energy storage module, upper and lower frictional snubber bearings are also provided to rotatably support rotor 14, through it is to be understood that said snubber bearings support rotor 14 only when rotor 14 is stationary, or rotating at very low speeds, prior to the attaining by rotor 14 of sufficient rotational speed to cause said periodic magnetic bearings to become fully effective or transiently when the module is sharply accelerated in vehicular applications.

The upper snubber bearing 210 is comprised of a suitable self-lubricating bushing, formed, e.g., of Teflon, which closely fits in an opening in the central portion of spider 132, and is maintained in position by a disk 214, which is itself affixed to the lower surface of spider 132. The outwardly projecting flange 218 of a generally cylindrical member 220 bears upon the upper surface of bushing 212, the cylindrical member 220 being itself affixed to the conical upper end 164 of hub body 160 by a retainer 222 and a cooperating screw 228.

The lower snubber bearing 230 is comprised of a metal track member 232 which is embedded in the generally conical upper surface of base member 204, and is flush with the surface thereof. The other major member of lower snubber bearing 230 is the ring-like track member 234 which is embedded in the conical inner surface of skirt 172. Circular track 232, may, for instance, be composed of a heat resistant metal, while track member 234 may be composed, for instance, of a sinter metal impregnated with a lubricant such as molybdenum disulphide which will operate as a lubricant without substantially impairing the vacuum maintained in shell 16. Since rotor 14 is very rapidly brought into its high operating speed range (e.g., 500 to 2,500 revolutions per second) by means of the motor action of alternator-motor 46, it will be realized by those having ordinary skill in the art, from FIG. 2, that track 232 contacts track 234 only intermittently, during a very brief operating period, i.e., during the bringing of the rotor 14 into its range of operating speeds, and that, thus, despite the relatively large diameter of tracks 232 and 234 they can be fabricated in such a way as to have suitably extended life under the operating conditions imposed by the operation of the inertial energy storage module shown and described herein.

The construction of spindle 144 will now be described, in connection with FIGS. 2 and 3.

Spindle 144 comprises base 204, cap 240, and the stator portion 241 of alternator-motor 46. Base 204 and cap 240 may be formed from the same material from which hub body 160 is formed, in the same manner.

As pointed out hereinabove, the permanent magnets 190-1 through 190-10 of the upper periodic magnetic bearing are embedded in cap 240, with their exposed surfaces flush with the conical outer surface 194 of cap 240. Cap 240 is also provided with a plurality of tapped holes 242 which are adapted to receive and retain the threaded ends of elongated bolts 244 as may be seen in FIG. 2, said bolts 244 first passing through holes in base 204 and then through holes in magnetic steel laminations 246 before being engaged in said holes 242 in cap 240. In the event that the material of cap 240 is unable to sustain threads of sufficient strength, it will be realized by those having ordinary skill in the art that suitable bushings may, instead, by molded into cap 240, and those bushings provided with suitable tapped holes for coaction with the threaded ends of said bolts 244. Thus, it may be seen that spindle 242 is comprised of base 204, a stack of magnetic steel laminations 246, and cap 240, joined together by means of elongated bolts 244.

As may be seen in FIG. 3, the laminations 246 are so configured as to define, when joined in stacked relation, six vertical slots 248. A plurality of windings 250 are disposed in slots 248, said windings being so arranged, and so interconnected with leads 52, 54, and 56, as to produce three-phase alternating potential upon leads 52, 54, and 56 when excited by the periodic changes in linking magnetic flux occasioned by the rotation of rotor 14 about spindle 144. The design and arrangement of such alternator windings is well-known to those having ordinary skill in the electrical machine design art, and thus will not be described in detail herein. The corresponding stator windings of alternator-motor 50 are so arranged that rotor 12 will contrarotate with respect to rotor 14 when the same three-phase charging voltages are applied to leads 52, 54, 56 and 60, 62, 64.

As may be seen in FIG. 2, base 204 is affixed to the central portion of spider 130 by means of suitable bolts 252, 254, which are represented only generally in the drawings, the provision of suitable fasteners, and the like, being within the scope of one having ordinary skill in the art without the exercise of invention, for which reason such fasteners, and the like, will not be described in detail herein.

The inertial energy storage module of the present drawings may be used, for instance, in a vehicle of the type described at page 150, et. seq., of *Machine Design* magazine, June 23, 1966, in the article entitled "The Cycloconverter Adjustable-Speed Drive", and at page 86, et. seq., of the *Popular Science* magazine, August, 1966, by substituting it for the engine driven alternator shown, for instance, in FIG. 11 of said *Machine Design* article.

As pointed out in said *Machine Design* article, there is no limitation on the maximum input frequency to the cycloconverter, but rather "...the form of the frequency converter output waveform will be improved as the frequency ratio across the converter is increased." Thus, the voltages produced on leads 52, 54, and 56, and on leads 60, 62, and 64 of the device of the present drawings may be simply adapted to supply operating power to the vehicle described in said *Machine Design* article by one having ordinary skill in the art without the exercise of invention.

The device of the present drawings is, of course, also well adapted for other uses, such as the supplying of power to propel private passenger automobiles, taxis, rapid transit trains, and the like, as well as to stationary applications.

Power to "charge" the device of the present drawings, i.e., bring rotors 12 and 14 up to operating speed, may be provided by means of a variable frequency rotary power converter consisting of a high frequency alternator driven by a variable speed motor as generally taught in said *Machine Design* article. Alternatively, the device of the drawings may be charged by a solid-state light weight static frequency converter and dc link converter of the kind made and sold by Lear Siegler, Inc., suitably modified within the scope of those having ordinary skill in the art.

The alternator-motors in the hubs of rotors 12 and 14 may, of course, be alternatively wired for other operating frequencies, or for N-Phase operation, where N is other than 3, without the exercise of invention.

In accordance with a principal feature of the present invention, the Young's Moduli and mean densities of the rings or radial increments of the felly of an inertial energy storage rotor should vary with their radii in such a way as to satisfy the following equation $$(Y/\rho) = Cr^{n(r)},$$

sometimes hereinafter called equation A, in which,
  $r$ is the mean radius of any particular ring,
  $Y$ is the Young's Modulus of said particular ring, i.e., the Young's Modulus of a linear specimen of the material of said particular ring, fabricated in substantially the same way as said particular ring, and of the same cross-section as said particular ring,
  $\rho$ is the mean density of said particular ring,
  $C$ is an empirically determined constant, and
  $n(r)$ includes constant values, i.e., values which are the same for all of the rings of a particular rotor.

The ratio $(Y/\rho)$ is sometimes hereinafter called the "elasticity-density ratio", and sometimes symbolized herein by the letter E.

When $n(r)$ has such a constant value (e.g., 2) equation A takes the particular form $$(Y/\rho) = Cr^n,$$

sometimes hereinafter called equation B. It is to be understood, however, that the present invention includes in its scope all inertial energy storage rotors of the general kind shown or described herein whose rings satisfy either equation A alone or both equation A and equation B, but not those whose rings satisfy equation B when $n$ equals zero.

A principal class of embodiments of the present invention is that class in which the exponent $n$ in equation B equals 2. Embodiments of this class are sometimes called "$n2$" embodiments herein, and the inertial energy storage rotors or modules of these $n2$ embodiments may sometimes be called $n2$ rotors or $n2$ modules hereinafter. Similarly, embodiments, rotors, and modules corresponding to which the exponent $n$ in equation B is 3 are called $n3$ embodiments, $n3$ rotors, and $n3$ modules, etc.

In $n2$ embodiments all of the rings 150 (FIG. 2) undergo substantially the same percentage distortion at the same rotor speed, and thus the radial interspacings between adjacent rings vary substantially in proportion to rotor speed. It follows that when the radial interspacings between rings 150 are small, in $n2$ embodiments, the matrix material 152 located between adjacent rings 150 will not be subjected to rupturing stresses over useful ranges of rotor speed. As will be apparent to those having ordinary skill in the art, the $n2$ form of equation B, i.e., the form of equation B in which small $n$ equals 2, is convenient to use for design purposes, and thus may often be adopted in designing particular embodiments of the present invention.

In some instances, however, particularly when it is desired to attain very high values of stored energy density by employing materials of the kind referred to, for instance, in example 1 below, and operating the rotor or rotors of the module at the highest possible maximum operating speed, it may be that in rotors designed in accordance with the $n2$ form of equation B undesirable stresses are produced in the matrix material 152 located between adjacent rings 150. In such cases it will be found desirable to redesign the rotor or rotors in accordance with a form of equation B other than the $n2$ form, or a form of equation A in which $n(r)$ is not equal to a constant, as a result of which the stresses imposed upon the matrix material 152 located between adjacent rings 150 are reduced below those values produced in $n2$ rotors. In such a case, by way of example only, an $n3$ rotor may be employed, i.e., a rotor corresponding to which equation B has its exponent $n$ equal to 3.

In selecting the value or values of $n$ to be used in the design of a particular rotor, it is convenient to eliminate the proportionality constant C from consideration by algebraically solving equation B for the constant C, giving $Y\rho^{-1}r^{-n}$; equating this expression for two rings, $i$ and $j$ (designating the common exponent by $n_{ij}$); and algebraically manipulating the resulting equation into the convenient form $$(r_j/r_i)n_{ij} = [(Y_j/\rho_j)/(Y_i/\rho_i)].$$

The common exponent $n_{ij}$ in this equation will sometimes hereinafter be called the "centrifugal separation index" of the pair of rings $i$ and $j$.

According to one embodiment of the present invention, an inertial energy storage module may be constructed which differs from the inertial energy storage module shown in the drawings in that its rotors are comprised of seven shells of rings, rather than the eight shells of rings shown in FIG. 2.

Let these seven shells of rings be designated S-1 through S-7, S-1 being the inner shell of rings in the same sense in which 150-1 is the inner shell of rings in FIG. 2.

Further, let the rings of this embodiment of the present invention be fabricated from lead glass, which may be fire polished and then coated with a surface-protective layer of sputter metal in accordance with the teachings of the abovesaid copending U.S. Pat. No. 3,683,216, of Richard F. Post, issued on Aug. 8, 1972.

In accordance with the present invention the composition of the glass from which all of the rings of a particular shell are fabricated may be selected from the following table.

TABLE I

| Shell | Radius (%) | Lead(%) | SiO$_2$(%) |
|---|---|---|---|
| S-1 | 100 | 15.0 | 85.0 |
| S-2 | 110 | 13.0 | 87.0 |
| S-3 | 120 | 10.0 | 90.0 |
| S-4 | 130 | 8.4 | 91.6 |
| S-5 | 140 | 5.5 | 94.5 |
| S-6 | 150 | 2.9 | 97.1 |
| S-7 | 160 | 0.0 | 100.0 |

While, according to the above table, the glasses listed therein are totally composed of either lead and silicon dioxide, or silicon dioxide alone, the present invention also embraces lead glass compositions in which certain percentages of other constituents well-known to those having ordinary skill in the glass-making art are substituted for corresponding percentages of lead, silicon dioxide, or both of them. As in the abovesaid copending U. S. Patent application of Richard F. Post, the words "glass" and "glasses" are used herein in their broadest acceptation, as including, but not limited to, quartz glass, flint glass, lime-soda glass, crown glass, borosilicate glass, fused quartz, and in general, any tensilely isotropic substances the modulus $U_0$ of which exceeds 300 Joules per gram, said modulus being the maximum tensile strength of any particular material in dynes per square centimeter divided by twice the density of that material in grams per cubic centimeter.

In accordance with another embodiment of the present invention, an inertial energy storage module may be constructed which differs from the inertial energy storage module shown in the drawings in that its rotors have seven shells of rings, rather than the eight shells of rings shown in FIG. 2.

Let these seven shells of rings be designated S-1 through S-7, S-1 being the inner shell of rings in the same sense in which 150-1 is the inner shell of rings in FIG. 2.

Further, let the rings of this embodiment of the present invention be fabricated from an embedded fiber composite material comprising carbon and tungsten fibers embedded in a matrix of plastic or metal, e.g., epoxy plastic.

In accordance with the present invention, then, the percentages by volume of carbon and tungsten fibers in the rings of each shell may be determined from the following table, in which it is assumed that the percentage by volume of epoxy plastic is 40 percent in all of the rings.

TABLE II

| Shell | Radius (%) | Volume % Carbon Fiber | Volume % Tungsten Fiber |
|---|---|---|---|
| S-1 | 40 | 11 | 49 |
| S-2 | 50 | 32 | 28 |
| S-3 | 60 | 43.5 | 16.5 |
| S-4 | 70 | 50.5 | 9.5 |
| S-5 | 80 | 54.6 | 5.4 |
| S-6 | 90 | 58 | 2 |
| S-7 | 100 | 60 | 0.0 |

It is to be noted that in this embodiment of the present invention the Young's Modulus is held constant, i.e., the Young's Modulus of each ring is substantially equal to the Young's Modulus of all of the other rings, while the mean densities of the rings vary from shell to shell in inverse proportion to the squares of their radii, in accordance with the $n2$ form of equation B. This is in contrast to the embodiment of Table I in which both the Young's Moduli and the mean densities of the rings are varied from shell to shell.

It will be seen that, within the scope of the above equations, three design procedures may be adopted, viz., varying both Young's Modulus and density (Table I), holding Young's Modulus constant and varying density (Table II), and holding density constant and varying Young's Modulus.

It is to be understood that rotors designed in accordance with any one of these three design procedures, and inertial energy storage modules employing the same, fall within the scope of the present invention.

It is also to be understood that rotors comprising embedded fiber composite material rings in which the embedded fibers are intertwisted fall within the scope of the present invention.

The rings of Table II may be fabricated according to the particular teachings of copending U.S. Pat. No. 3,683,216, of Richard F. Post, issued on Aug. 8, 1972, which contemplate that the Young's Modulus of the carbon fibers of all of the rings will be made substantially equal to the Young's Modulus of tungsten by the heat treating procedure described in the above-cited article of A. C. Ham, entitled "Carbon Fiber Composites for Aerospace Structures". By thus substantially matching the Young's Moduli of all of the fibers used, both carbon and tungsten, it is made possible to provide sets of rings whose properties conform to the teachings of the present invention by the simple step of selecting the relative percentage components of carbon and tungsten fibers employed in the fabrication of each ring, following, e.g., Table II.

Given the above teachings, and the above tabulated examples, the selection of other graduated series of materials from which to fabricate the rings of successive shells in order to carry out the present invention will be obvious to those having ordinary skill in the art without themselves exercising invention.

As may be determined by experimental operation of a graduated-ring-material rotor of the present invention designed according to the $n2$ form of equation B, compared with a rotor designed in accordance with the form of equation B in which the exponent $n$ equals zero, i.e., lying outside the scope of the present invention, the advantage of the graduated-ring-material rotor of the present invention lies not only in avoiding destruction of the rotor by the production of stresses in the matrix material lying between adjacent rings, but also in the fact that the graduated-ring-material rotor of the invention can store considerably more, e.g., 80 percent, energy in the same rotor volume.

According to another aspect of the present invention the rings of the outer shell of the rotor (150-8, FIG. 2) may be so made as to insure that in the event that the rotor is inadvertently operated at a speed greater than the maximum operating speed for which it is designed only the rings of the outer shell will fail, thus minimizing the amount of material which can be thrown outward in the event of inadvertent overspeeding of the rotor. It also lies within the scope of the present invention to thus modify one or more, but not all, of the rings of the outer shell 150-8. All variations in the structure of certain ones of the rings 150 by means of which they can be made more susceptible to rupture than the balance of the rings are embraced within the scope of the present invention. By way of example, one or more rings of shell S-7 in Table II may be notched in order to locally reduce its cross-sectional area, or may be made in part of a weaker material. Further, it should be noted that the rupture of only one such designedly "weak" ring will probably pierce shell 16, but not tank 18, thus causing the interior of shell 16, due to its evacuated state, to rapidly fill with the liquid 20, by which the remaining energy stored in the rotors 12 and 14 will be rapidly dissipated in a nondestructive manner.

It will thus be seen that the object set forth above, among those made apparent from the preceding description, are efficiently attained, and, since certain changes may be made in the above constructions without departing from the scope of the invention, it is intended that all matter contained in the above description, or shown in the accompanying drawings, shall be interpreted as illustrative only, and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new, and desire to secure by Letters Patent, is:

1. An inertial energy storage rotor, comprising:
a plurality of continuous, high-strength rings of different mean radii; and
means for maintaining said rings in a predetermined, substantially coaxial collocation at rotor standstill;
the elasticity-density ratio of each of the rings of said plurality being greater than the elasticity-density ratio of all of the ones of said rings which are of smaller mean radius.

2. An inertial energy storage rotor as claimed in claim 1 in which the resistance to rupture by centrifugal force of at least one of said rings is less than the resistance to rupture by centrifugal force of the remainder of said rings.

3. An inertial energy storage rotor as claimed in claim 2 in which the radius of said at least one of said rings is at least as large as the radius of any one of the remainder of said rings.

4. An inertial energy storage rotor as claimed in claim 1 in which at least some of said rings are comprised of diverse glasses.

5. An inertial energy storage rotor as claimed in claim 1 in which the inner rings substantially follow the outer rings as the rings grow in response to centrifugal force.

6. An inertial energy storage rotor as claimed in claim 1 in which at least some of said rings are comprised of glass and provided with one or more protective coatings.

7. An inertial energy storage rotor as claimed in claim 1 in which said rings are composed of fibers embedded in a matrix of cementitious material.

8. An inertial energy storage rotor as claimed in claim 7 in which said fibers are intertwisted before being embedded in said cementitious material.

9. An inertial energy storage rotor, comprising:
a plurality of pairs of continuous, contiguous, high-strength rings of different mean radii; and
means for maintaining said rings in a predetermined, substantially coaxial collocation at rotor standstill;
the elasticity-density ratios of the rings of each of said pairs being so related to their mean radii that said pairs have centrifugal separation indices greater than zero.

10. An inertial energy storage rotor as claimed in claim 9 in which the resistance to rupture by centrifugal force of at least one of said rings is less than the resistance to rupture by centrifugal force of the remainder of said rings.

11. An inertial energy storage rotor as claimed in claim 10 in which the radius of said at least one of said rings is at least as large as the radius of any one of the remainder of said rings.

12. An inertial energy storage rotor as claimed in claim 9 in which at least some of said rings are comprised of diverse glasses.

13. An inertial energy storage rotor as claimed in claim 9 in which the inner rings substantially follow the outer ring as the rings grow in response to centrifugal force.

14. An inertial energy storage rotor as claimed in claim 9 in which at least some of said rings are comprised of glass and provided with one or more protective coatings.

15. An inertial energy storage rotor as claimed in claim 9 in which said rings are composed of fibers embedded in a matrix of cementitious material.

16. An inertial energy storage rotor as claimed in claim 15 in which said fibers are intertwisted before being embedded in said cementitious material.

17. An inertial energy storage rotor, comprising:

a plurality of pairs of continuous, contiguous, high-strength rings, said pairs of rings being of different mean radii, the centrifugal separation indices of each of said pairs of rings being greater than unity; and means for maintaining the rings of the rotor in a predetermined, substantially coaxial collocation at rotor standstill.

18. An inertial energy storage rotor as claimed in claim 17 in which the resistance to rupture by centrifugal force of at least one of said rings is less than the resistance to rupture by centrifugal force of the remainder of said rings.

19. An inertial energy storage rotor as claimed in claim 18 in which the radius of said at least one of said rings is at least as large as the radius of any one of the remainder of said rings.

20. An inertial energy storage rotor as claimed in claim 17 in which at least some of said rings are comprised of diverse glasses.

21. An inertial energy storage rotor as claimed in claim 17 in which the inner rings substantially follow the outer ring as the rings grow in response to centrifugal force.

22. An inertial energy storage rotor as claimed in claim 17 in which at least some of said rings are comprised of glass and provided with one or more protective coatings.

23. An inertial energy storage rotor as claimed in claim 17 in which said rings are composed of fibers embedded in a matrix of cementitious material.

24. An inertial energy storage rotor as claimed in claim 23 in which said fibers are intertwisted before being embedded in said cementitious material.

25. An inertial energy storage rotor, comprising:
a plurality of pairs of continuous, contiguous, high-strength rings, all of which rings are of different mean radii, the centrifugal separation indices of each of said pairs of rings being greater than zero; and means for maintaining the rings of the rotor in a predetermined, substantially coaxial collocation at rotor standstill.

26. An inertial energy storage rotor as claimed in claim 25 in which the resistance to rupture by centrifugal force of at least one of said rings is less than the resistance to rupture by centrifugal force of the remainder of said rings.

27. An inertial energy storage rotor as claimed in claim 26 in which the radius of said at least one of said rings is at least as large as the radius of any one of the remainder of said rings.

28. An inertial energy storage rotor as claimed in claim 25 in which at least some of said rings are comprised of diverse glasses.

29. An inertial energy storage rotor as claimed in claim 25 in which the inner rings substantially follow the outer ring as the rings grow in response to centrifugal force.

30. An inertial energy storage rotor as claimed in claim 25 in which at least some of said rings are comprised of glass and provided with one or more protective coatings.

31. An inertial energy storage rotor as claimed in claim 25 in which said rings are composed of fibers embedded in a matrix of cementitious material.

32. An inertial energy storage rotor as claimed in claim 31 in which said fibers are intertwisted before being embedded in said cementitious material.

33. An inertial energy storage rotor comprising a plurality of continuous, high-strength rings of different mean radii supported in substantially coaxial, contiguous relation by resilient means, the elasticity-density ratios of substantially all of said rings being varied in accordance with their mean radii, whereby to reduce the stresses in said resilient means produced by the effect of centrifugal force upon said rings.

34. An inertial energy storage rotor as claimed in claim 33 in which said rings consist entirely of glasses.

35. An inertial energy storage rotor as claimed in claim 33 in which said rings are composed of fibers embedded in a matrix of cementitious material.

36. An inertial energy storage rotor as claimed in claim 35 in which said fibers are intertwisted before being embedded in said cementitious material.

37. An inertial energy storage rotor, comprising:
a plurality of continuous, high-strength rings of different mean radii; and means for maintaining said rings in a predetermined, substantially coaxial collocation at rotor standstill;

each of said rings of said plurality comprising strands of diverse materials, the relative proportions of said strands of diverse materials in said rings of said plurality being such that the elasticity-density ratios of said rings of said plurality vary in accordance with their radii.

38. An inertial energy storage rotor as claimed in claim 37 in which the resistance to rupture by centrifugal force of at least one of said rings is less than the resistance to rupture by centrifugal force of the remainder of said rings.

39. An inertial energy storage rotor as claimed in claim 38 in which the radius of said at least one of said rings is at least as large as the radius of any one of the remainder of said rings.

40. An inertial energy storage rotor, comprising:
a plurality of pairs of continuous, contiguous, high-strength rings of different mean radii, at least some of said pairs of rings being comprised of materials so compounded that they have centrifugal separation indices greater than zero; and means for maintaining said rings in a predetermined, substantially coaxial collocation at rotor standstill.

* * * * *